Nov. 1, 1927.

E. E. JOSEF

SHAFT COUPLING

Filed May 23, 1925

1,647,802

Inventor,
Edward E. Josef,
by Geyer & Geyer
Attorneys.

Patented Nov. 1, 1927.

1,647,802

UNITED STATES PATENT OFFICE.

EDWARD E. JOSEF, OF BUFFALO, NEW YORK.

SHAFT COUPLING.

Application filed May 23, 1925. Serial No. 32,246.

This invention relates to improvements in shaft couplings.

One of its objects is to provide a simple and inexpensive coupling of this character which can be readily attached to and removed from the shaft-sections.

Another object of the invention is to so construct the coupling that it will firmly and positively grip the shaft-sections and hold them in perfect axial alinement.

A still further object is the provision of a one-piece coupling which is adapted for use with shafts of different sizes.

Figure 1:
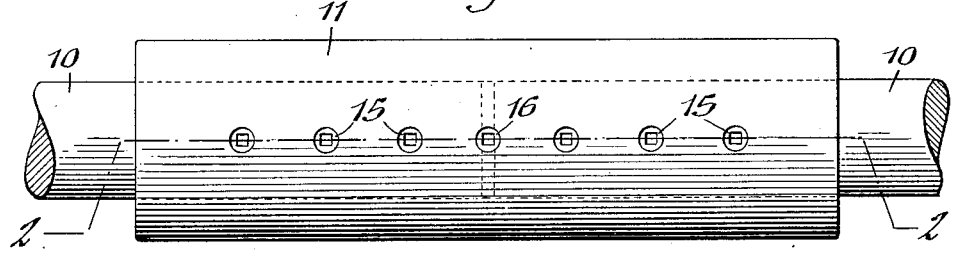
Figure 2:
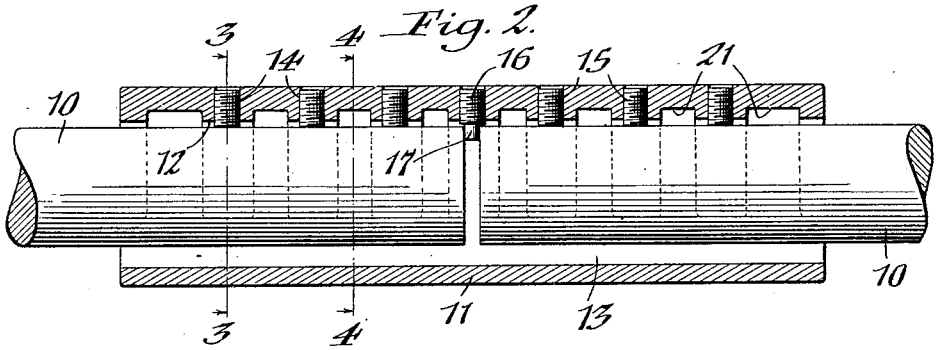
Figure 3:
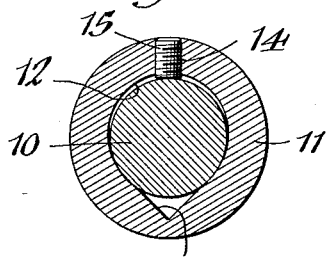
Figure 4:
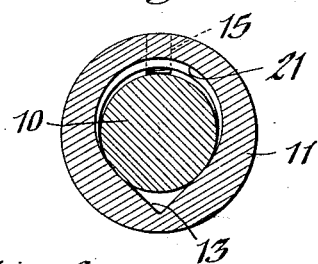
Figure 5:
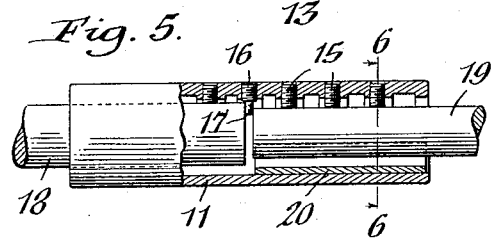
Figure 6:
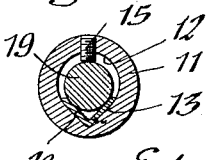

In the accompanying drawings:—Figure 1 is a top plan view of the improved coupling. Figure 2 is a longitudinal section thereof on line 2—2, Fig. 1. Figures 3 and 4 are transverse sections on the correspondingly numbered lines in Fig. 2. Figure 5 is a sectional side elevation of the coupling showing the same joining shafts of different sizes. Figure 6 is a transverse section on line 6—6, Fig. 5.

Similar characters of reference indicate corresponding parts throughout the several views.

Referring to Figs. 1–4, inclusive, the numerals 10, 10 indicate the opposing shaft-sections which are, in this instance, of the same size, and 11 indicates the coupling for joining said shaft-sections in axial alinement.

This coupling is made in one piece and is preferably in the form of a comparatively long sleeve so as to provide an extensive bearing on the opposing ends of the shaft-sections. The bore of the coupling-sleeve is, by preference, shaped in the manner shown in Figs. 3 and 4, being provided in one side thereof with a substantially semi-circular portion 12 and in its diametrically opposite side with a V-shaped seat 13 extending throughout the length of the sleeve. In that side of the latter containing the portion 12 are a series of radial, internally-threaded openings 14 for receiving set screws 15 which force and clamp the shaft-sections 10 firmly against the opposing walls of the V-shaped seat, the sides of the latter and said screws constituting a three point bearing for the shaft-sections and insuring their perfect axial alinement.

In order to readily and accurately center the shaft-sections in the coupling sleeve, so that they both extend into the sleeve the same distance, a stop screw 16 is arranged approximately midway thereof and has a pin or projection 17 which extends into the sleeve-bore and against which the opposing ends of said sections are adapted to abut, as shown in Fig. 2. Upon sufficiently unscrewing this stop screw and releasing the clamping screws 15, the coupling sleeve can be slipped lengthwise upon the end of either shaft-section 10 for uncoupling the parts.

In Figs. 5 and 6, the coupling is shown as adapted for connecting shaft-sections of different diameters. In this case, the larger shaft-section 18 is clamped in the manner previously described while the smaller shaft-section 19 requires the use of one or more shims 20 applied to the V-shaped seat 13 of the coupling-sleeve to bring said smaller shaft in axial alinement with the larger one. This smaller shaft is then clamped securely in place by the set screws 15. As shown in Fig. 6, the shim is preferably angular in cross-section to fit the seat of the coupling-sleeve.

For the purpose of reducing its weight, the bore of the coupling-sleeve 11 may be recessed or grooved, as shown at 21 in Figs. 2 and 4. It will be noted that these recesses extend around the curved portion of the sleeve-bore and terminate at or are flush with the side walls of the V-shaped seat 13. This construction also results in the weight of the sleeve being distributed uniformly about its entire circumference, rendering the same balanced.

This improved shaft-coupling is cast in one piece from iron or steel and with the exception of the tapped openings 14 requires no machining operations. While manifestly simple and inexpensive in construction, it effectually and reliably connects the shaft-sections as a unit and maintains them in perfect alinement, whether they be of the same or different diameters. Furthermore, the coupling can be easily and quickly attached and removed and on account of its extensive three-point bearing with the shaft-sections, the use of keys and key-ways are eliminated. In addition to these advantages, this coupling is free from projecting parts and, if desired, it may be used as a bushing for receiving a pulley.

I claim as my invention:—

A device of the character described, comprising a comparatively long one-piece coupling sleeve for receiving the ends of opposing shaft-sections, one side of the sleeve-bore being substantially semi-circular and its opposite side being provided with straight converging side walls arranged tangential to said semi-circular portion of the bore and forming a V-shaped seat for the shaft-sections, a series of radially-disposed clamping screws arranged in that side of the sleeve containing the semi-circular portion of the bore for forcing the shaft-sections into said seat, the converging side walls of the bore and said screws constituting gripping elements for the shaft-sections, and a centering screw arranged midway of the coupling-sleeve in one side thereof and having a projection extending into its bore for centering the shaft-sections therein.

EDWARD E. JOSEF.